Dec. 8, 1942.     C. V. SMITH ET AL     2,304,663
METHOD FOR PRE-HEATING LENS MAKING MATERIALS
Filed Sept. 5, 1940     2 Sheets-Sheet 1
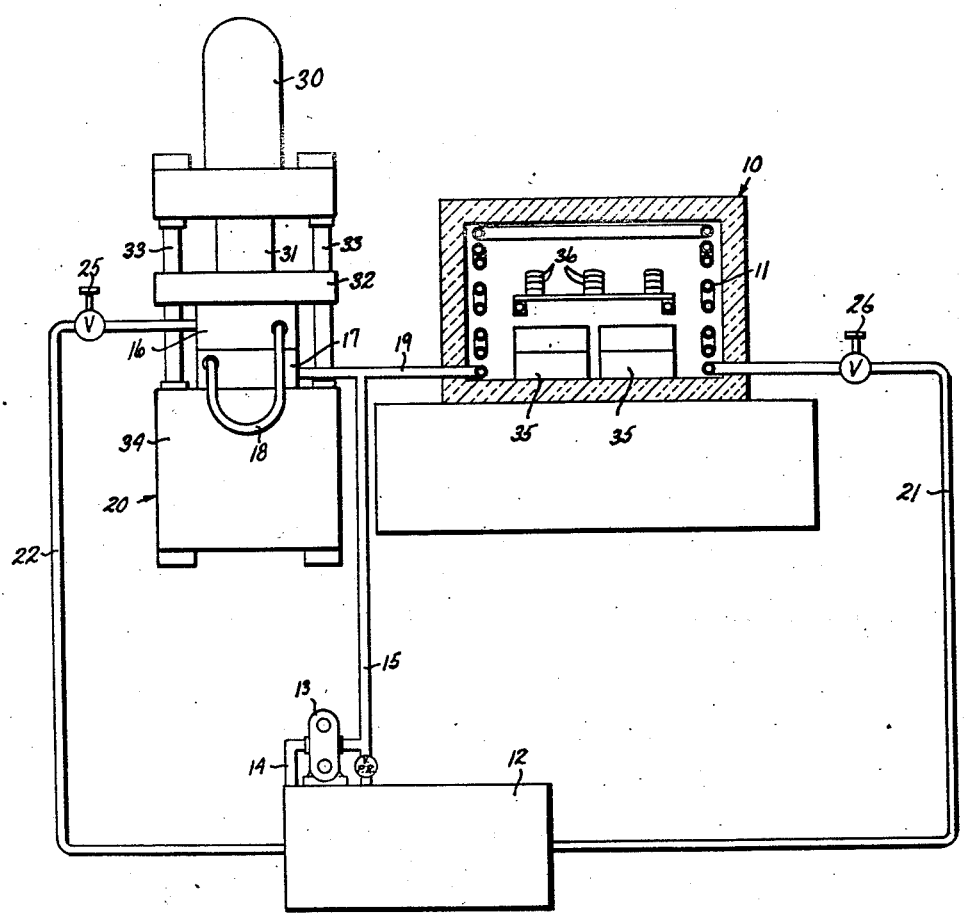
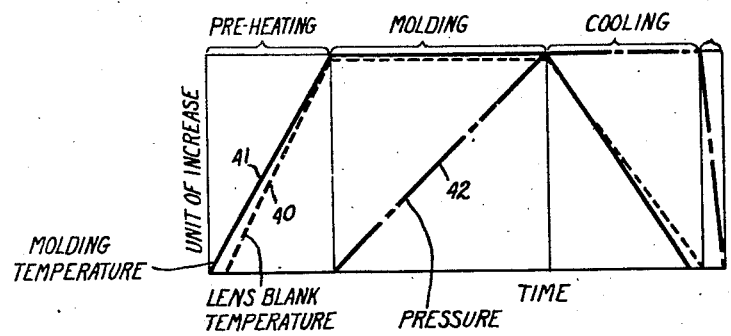
INVENTOR
CHARLES V. SMITH
FRANK P. WILLIAMS
BY
ATTORNEYS Dec. 8, 1942.  C. V. SMITH ET AL  2,304,663
METHOD FOR PRE-HEATING LENS MAKING MATERIALS
Filed Sept. 5, 1940   2 Sheets-Sheet 2
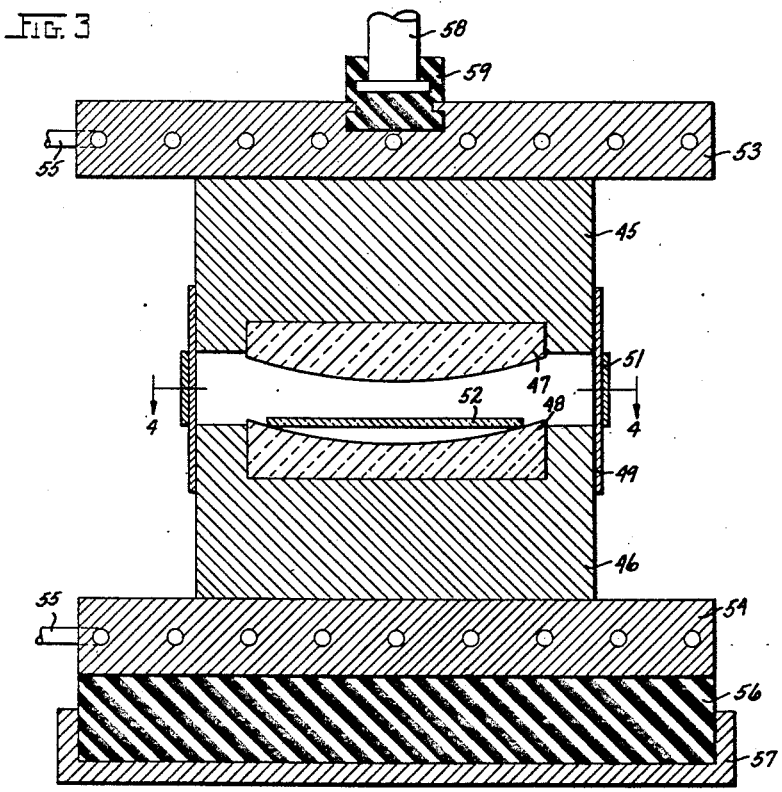
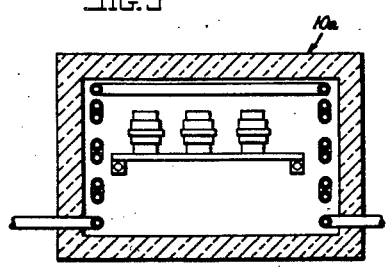
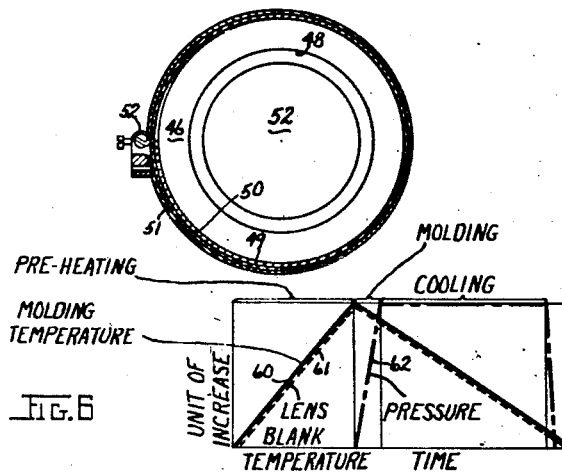
INVENTOR
CHARLES V. SMITH
FRANK P. WILLIAMS
BY
ATTORNEYS Patented Dec. 8, 1942

2,304,663

UNITED STATES PATENT OFFICE 2,304,663

METHOD FOR PREHEATING LENS MAKING MATERIALS

Charles V. Smith and Frank P. Williams, Dayton, Ohio, assignors to The Univis Lens Company, Dayton, Ohio, a corporation of Ohio Application September 5, 1940, Serial No. 355,490

9 Claims. (Cl. 18—56)

This invention relates to a method for producing unbreakable lenses from synthetic materials.

When producing lenses from synthetic materials, by deforming a blank of synthetic resin between forming dies, the usual practice heretofore has been to heat the blank of synthetic resin while within the forming press. This arrangement entails a long cycle of operation of a press in which a lens is to be formed, the cycle of operation including the entire period of heating, forming and subsequent cooling. Since the synthetic resins absorb heat relatively slowly, the heating period of a blank of synthetic resin has required relatively prolonged periods of time. The press during this time is retained from operation and the process is extremely uneconomical.

The usual procedure heretofore followed in forming lenses from synthetic materials has been to position the forming dies securely within a press. The dies were heated, by any suitable means, to the temperature at which it was desired to work the blank of resinous material within the dies. A blank of resinous material, of suitable size and thickness, was positioned between the forming faces of the forming dies. These faces were provided with surfaces having an optical curvature of the desired shape which were arranged to cooperate to form the lens from the blank of resinous material positioned therebetween when closing pressure was applied upon the dies. The forming pressure was retained upon the dies over a period of time sufficient to alter the physical shape of the blank of resinous material until it conformed with the optical curvature of the dies. The dies were then cooled sufficiently to set the lens blank to altered shape.

This entire forming operation has heretofore been carried out upon a press which resulted in relatively long periods of idle operation of the press for lens forming purposes.

It is thus an object of this invention to provide a method for forming a blank of resinous material having optically curved surfaces by pre-heating the material before placing the same in the forming press.

Another object of the invention is to provide a method for forming lenses from blanks of synthetic resinous material by pre-heating the blanks and the forming dies to a common elevated temperature, and subsequently placing the forming dies with a lens blank therebetween within a press for applying forming pressure upon the dies.

It is another object of the invention to provide a method for forming lenses from synthetic resin wherein a pre-heated pair of forming dies, with a blank of resinous material therebetween, is positioned within an unheated press, the residual heat of the dies retaining the blank within the range of forming temperatures for a sufficient time to permit formation thereof.

Another object of the invention is to provide a method for forming lenses from synthetic resin wherein a pair of forming dies are preheated with a lens blank therebetween as a unit, elevating their temperature to a common level and subsequently pressing the preheated unit within a forming press.

Another object of the invention is to preheat a pair of forming dies with a resinous lens blank therebetween to a uniform elevated temperature and to subsequently apply pressure upon the dies for forming the resinous blank into a shape conforming with the optical curvature of the dies by deforming the blank at a rate which will not produce deleterious optical strain in the formed blank.

Another object of the invention is to provide a method for pre-heating a blank of resinous material wherein the die surfaces are retained in spaced relation with a resinous lens blank therebetween during pre-heating.

A still further object of this invention is to provide a method for forming lenses from synthetic resin wherein a pair of dies having optically curved surfaces thereon are positioned in spaced relation so that a resinous blank of material can be inserted therein without having the die faces engage the same, whereupon the die elements and the lens blank can be elevated in temperature as a unit, and can be subsequently placed within a press for applying pressure upon the die for forming the resinous blank of material.

Another object of the invention is to provide a process in which a blank of resinous material can be pre-heated within means for permitting angular displacement of the optically curved surfaces of suitable dies to permit the optical surfaces thereof to assume proper relation with respect to each other.

Further objects and advantages will appear from the description and the drawings.

In the drawings:

Figure 1 shows a diagrammatic system for carrying out the method of this invention, Figure 2 is a curve chart representing the various steps of the method and the temperatures and rates of formation encountered, Figure 3 is a partial cross-sectional view of a press illustrating the formation of a lens within a press following the teachings of this invention, Figure 4 is a cross-sectional view taken along line 4—4 of Figure 3, Figure 5 is a diagrammatic cross-sectional view of an oven suitable for pre-heating die units, Figure 6 is a curve chart representing the various steps of a method for forming optical articles wherein the forming press is not heated.

This invention consists of a method for forming blanks of synthetic resin into a configuration having optically curved surfaces.

In general, the method consists of positioning a blank of resinous material between die members which have optically curved surfaces appropriated thereon. These die members are retained in spaced relation during a pre-heating or temperature elevating period. A pair of die members with a resinous blank therebetween, comprises a unit which is positioned within an atmosphere maintained at an elevated temperature. The die elements and the resinous blank are elevated in temperature uniformly within the atmosphere, which atmosphere preferably brings the temperature of the resinous blank and dies to within a range of temperatures at which the lens blank can be altered in its physical shape.

Upon the dies and blank of resinous material reaching a determined temperature, or within a range of temperatures, the unit, consisting of the dies and blank, is removed from the high temperature atmosphere and positioned within a press. The press will apply pressure upon the dies to cause the same to engage the blank of resinous material, whereupon the blank will assume the configuration of the optical curvature of the die surfaces.

To produce a satisfactory optical article from a blank of resinous material, we have determined that there is a specific rate of deformation for each temperature at which the resinous blank is worked. In general, the rate of deformation is greater as the temperature of the resinous material is increased. The rate of deformation of a blank of resinous material which will not destroy its optical properties is determined by several factors. It is well known that all plastic materials have plastic flow when pressure is applied to the material, either tending to deform the same, or to stretch or compress the same. It has also been determined that a plastic material has a rate of plastic flow throughout the deformation range, beyond which there is a physical degradation of the molecular structure of the resin.

The rate of deformation of a plastic is related to both the plastic flow and the elasticity. The elasticity is higher during the early stages of deformation of a plastic material, but rapidly tapers off as the material is further deformed. The plastic flow of the material is relatively slow, hence, when the rate of deformation goes beyond the rate of plastic flow, the rate of deformation must slow down until the plastic flow can meet the newly formed altered condition. The point at which the deformation slows down to a substantially constant rate determined by the rate of plastic flow, produces a rate of deformation beyond which plastic flow is forced, whereby optical strain is produced.

These optical strains may not be of such a value as impair the physical properties of the material, but are of such value that the strains produced displace the optical paths through the plastic material. By controlling the rate of deformation to control the value of the optical strain, the physical properties of the material are not impaired by the mechanical stress frozen in the material when set, which normally cause the material to become more soft, more susceptible to shatter, and loss of chemical resistance. It is this displacement of optical paths, resulting in bi-refringence, which impairs the optical properties of a lens.

As heretofore stated, the rate of deformation is determined by the temperature of the plastic material, and it can be seen that a relatively accurate and uniform temperature and control of the material is desirable.

Hence, in this invention we provide an oven or enclosure 10 which may be insulated for retaining heat therein. The enclosure 10 is provided with a plurality of heating coils 11 through which a heating fluid may circulate. While we mention the heating fluid with regard to means for heating the enclosure 10, it is recognized that any means can be used for heating the interior of the enclosure 10. The heating means should be under control of a suitable controlling device for regulating the temperature of the enclosure 10.

In the present instance, a fluid tank 12 is provided. This fluid tank 12 is arranged with a suitable heating source therein, which is automatically controlled for maintaining the temperature of the fluid therein relatively constant. The heating source within the fluid tank 12, and the controls for the same, are well known in the art and further description thereof is not deemed necessary. A fluid pump 13 is connected to the fluid tank 12 and withdraws fluid therefrom through the conduit 14 and discharges same through the conduit 15.

The conduit 15 is connected to a conduit 19 which communicates with a mold carrying member 17 of the press 20. The mold or die carrying member 17 forms the lower half of a cooperating mold and die combination. The upper mold or die carrying member 16 is connected to the other mold or die carrying member 17 by means of a fluid circulating conduit 18. This conduit 18 permits the hot circulating fluid to be circulated through the die carrying members 16 and 17 in series and discharge from the upper die carrying member 16 through the discharge conduit 22. The fluid from the pump discharge conduit 15 also circulates through the conduit 19 connected with the heating coils 11 positioned with the heating enclosure 10. The fluid returns to the tank 12 from the heating conduits 11 through the conduit 21. While the heating circuits for the die carrying members 16 and 17 and the enclosure 10 have been described as being in parallel relation, it is also possible to arrange the circuit as a series circuit if desired.

We have heretofore mentioned the fluid tank 12 with regard to a heating system, the heating fluid being circulated as heretofore described. It may also be considered that the tank 12 may contain apparatus for cooling a fluid for circulating through the mold carrying members 16 and 17 for cooling the same during certain cycles of operation in the formation of a lens from a blank of resinous material. Under normal conditions, however, the die or mold carrying members 16 and 17 will cool sufficiently rapidly after the heating fluid has been stopped in circulation therethrough to permit the formed lens blank to be removed therefrom within a reasonable period of time.

A control valve 25 is positioned in the return conduit 22 from the mold or die carrying member 16, while a control valve 26 is provided in the return conduit 21 from the heating coil 11 of the enclosure 10. The fluid circulating through either the mold carrying members 16 and 17 or through the heating coil 11 may thus be individually controlled to control the quantity of fluid flowing therethrough and thus the temperature thereof. This manner of temperature control of the die carrying members 16 and 17 and heating coil 11 is in addition to an automatic control of the temperature of the fluid within the tank 12.

The press 20, for forming the pressing or forming operation, is of conventional construction and is diagrammatically represented. The press generally consists of a hydraulic actuating cylinder 30 having a plunger 31 extending therefrom. The plunger 31 carries a platen 32 which is guided upon the rods 33. The platen 32 carries the upper die or mold carrying member 16. The lower die or mold carrying member 17 is suitably positioned and carried upon the bed 34 of the press. The press controls and actuating elements are well known in the art and further description of the same is not believed necessary.

The interior of the enclosure 10 is maintained at an elevated temperature, considerably above room temperature, by means of the heating coil 11. A plurality of pairs of dies 35, and a plurality of blanks 36 of resinous material are adapted to be placed within the enclosure 10 for elevating the temperature thereof. When molding a large number of lenses upon a press, it is of particular advantage to have the die members and the lens blank heated to within the range of molding temperatures at which the lens blanks are to be worked. The pre-heating of the dies and the blanks of resinous material eliminates the necessity of heating the blanks of resinous material after being positioned between the dies and within the press. The lens blanks 36 and the dies 35 are completely surrounded by the high temperature atmosphere within the enclosure 10, hence, the heating of the dies 35 and the blanks of resinous material 36 will save considerable time by heating the blank within the dies before being positioned within the press. Further, the press can then be used for forming operations only, and thus be in substantially continuous operation, since there is no need of waiting for an increase of temperature of the lens blanks 36 prior to the formation thereof.

The heating of the die carrying members 16 and 17, by the fluid circuit heretofore described, retains the dies 35 at molding temperature throughout the molding operation, hence, the temperature of the blank of resinous material is maintained substantially constant.

As heretofore mentioned, the deformation rate of a blank of resinous material is predetermined according to the temperature at which the blanks are to be worked. This deformation rate is of a determined order and cannot be greater than a rate which has been predetermined to be the maximum rate at which a blank of resinous material can be deformed at the particular temperature at which it is to be worked. Since the die elements 35 and the blanks of resinous material are pre-heated to the same temperature, and are uniformly heated, the maximum temperature of the same can be controlled. The die members 35 and the blank 36 can be removed from the interior of the enclosure 10 and the blank 36 be positioned within the mold 35. This unit, comprising the die elements 35 and the blank 36 is then positioned within the press 20 at a controlled temperature.

The temperatures of the blank 36 and die elements 35 are indicated by the lines 40 and 41 respectively, (see Figure 2). It may thus be seen, by referring to the chart of Figure 2, that the first step of pre-heating brings the die elements and blank up to molding temperature. The pre-heated unit may then have pressure applied upon the die elements by the press 20. The rate of increasing pressure application by the press 20 upon the die elements 35 has been predetermined to be the proper rate for forming the pre-heated lens blank at the temperature at which it is to be worked. This increasing rate of pressure application can be controlled either manually or automatically, however, the rate never exceeds the predetermined rate. During the forming operation, the pressure is gradually increased upon the die elements 35 as indicated by the line 42 of the chart of Figure 2.

Upon completion of the forming operation, the die elements 35, which have been positioned in the press 20 and retained at molding temperature by the fluid circulating through the die carrying elements 16 and 17, may be cooled either by the circulation of fluid through the mold carrying members 16 or 17, or by closing the valve 25 which stops circulation of heating fluid. The cooling of the die and blank of resinous material causes the lens blank to set in its altered shape, and may thereafter be removed from the dies upon release of pressure by the press 20.

As heretofore described, the die elements and the blanks of resinous material were pre-heated within an atmosphere at elevated temperature, as individual units, and were subsequently placed in their proper relation prior to the insertion of the thus assembled unit into the press. To insure an absolute and uniform heating of the die elements and the blank of resinous material, we prefer to assemble the die elements and a blank of resinous material as units prior to pre-heating, and pre-heat such assembled elements as a unit. Further, we prefer to provide an arrangement wherein a blank of resinous material is positioned between the optically curved surfaces of a pair of die elements, and to space the die elements in spaced relationship, the surfaces of the blank being under no pressure during the pre-heating thereof. We prefer to arrange the die elements in spaced relationship to prevent local overheating or the heating of local spots for a longer period of time than other portions of the blank of resinous material positioned therebetween. If a blank of resinous material is positioned between dies having curved surfaces and the assembly is pre-heated to elevate the temperature of the assembly to molding temperature and the dies are permitted to contact the resinous blank the points of direct contact between the blank and the dies are brought up to temperature relatively soon. These spots are retained at the elevated temperature over a longer period of time than are those areas which are not contacted directly. We have found that these local "hot spots" have resulted in changes of the optical properties of the material, particularly in a change in the index of refraction of the material in the area of the "hot spot."

To provide an assembly which can be preheated as a unit, we provide a pair of die elements 45 and 46. These die elements 45 and 46 may have formed therein surfaces providing an optical curvature, which surfaces may be formed within the face of the dies, or may be provided in the nature of inserts 47 and 48 placed in the dies 45 and 46 respectively. These inserts are preferably of glass, which produces the exacting surface finish required for optical surfaces.

The die elements 45 and 46 are adapted to be retained in spaced vertical relation by means of a sleeve 49 positioned therearound. This sleeve 49 is provided with over-lapping ends as indicated at 50, to permit a certain degree of expansion thereof. The dies 45 and 46 are provided with relatively accurate circumferences so that the sleeve 49 will axially align the centers of the die elements 45 and 46, and thus will align the inserts 47 and 48 in an axial manner. A tightening band 51 is positioned around the sleeve 49 substantially midway between the ends thereof, which locates the band 51 at substantially the horizontal middle of the die members 45 and 46. This band 51 may be tightened by the screw 52 to retain the sleeve 49 in frictional engagement with the die elements 45 and 46.

The die elements 45 and 46 may thus be assembled with a blank of resinous material 52 positioned therebetween. The assembly of the die elements 45 and 46 is such that they are retained in spaced relation with respect each other so that the blank of resinous material 52 is not contacted by the curved faces of the dies over the area from which the lens or plano will be produced. The sleeve 49 is tightened upon the die elements 45 and 46 by means of the band 51, whereby the assembly may be positioned within an oven or heating enclosure 10a for pre-heating.

The sleeve 49 encircles and encloses the annular space between the die elements 45 and 46 after once assembled. Since the sleeve 49 remains upon the die elements 45 and 46 during the preheating and the subsequent pressing or forming operation, foreign matter will be excluded from within the annular space between the die elements which would tend to injure the surface of the blank upon formation thereof, and the die surfaces are retained out of contact with the resinous blank during the entire pre-heating operation.

The units comprising the dies 45, 46 and the blank of resinous material 52 are elevated to a determined temperature within the enclosure 10a. Since the enclosure 10a is retained at substantially a constant temperature in a manner similar to the enclosure 10, the units may be retained within the enclosure for any period of time to insure a uniform heating of the dies and blank of resinous material.

The pre-heated unit upon reaching its ultimate temperature can be removed from the pre-heating enclosure 10 and be positioned between the pressing platens of a press.

The pressing platens 53 and 54 can be heated by any suitable means, such as the fluid circulating passages 55 (see Figure 3). The pressing platen 54 is preferably positioned upon a resilient support member 56 which in turn is supported by the press base 57. The resilient support member 56 may take the form of a block of soft rubber or a plurality of springs may be positioned between the pressing platen 54 and the base 57 to resiliently support the platen 54. We do not wish to limit ourselves to the use of any specific resilient supporting means, but rather the resilient support 56 may take any form which will permit the pressing platen 54 to displace itself angularly with respect the base 57. The upper pressing platen 53 is secured to the plunger 58 which extends from the power source for the press, and provides the means for applying pressure upon the pre-heated unit positioned between the platens 53 and 54. The platen 53 is secured to the plunger 58 by means of a resilient member 59, which may take the form of a block of soft rubber which is vulcanized to both the platen 53 and the plunger 58, whereby the platen is secured to the plunger.

The vertical axis of the resilient support 59 is arranged in alignment with the central vertical axis of the platen 54. The pre-heated die unit, containing a blank of resinous material, is positioned between the platens 53 and 54 so that the central axes of the die members 45 and 46 are in substantial alignment with the vertical axis of the plunger 58 and the platen 53.

As heretofore described, the die members 45 and 46 are held in spaced relation by means of the friction engaging sleeve 49. However, when the plunger 58 moves the platen 53, the die member 45 will be moved within the sleeve 49 to approach the die member 46, whereby the blank of resinous material 52 will be caused to assume the optical curvature placed on the faces of the die inserts 47 and 48.

The sleeve 49 retains the dies 45 and 46 in substantial axial alignment. However, there may be slight mis-alignment of the planes of the optical curvature of the die inserts 47 and 48. This mis-alignment of the inserts 47 and 48 may occur from various causes. When producing an article for optical work which has parallel and equidistantly spaced optically curved surfaces, the curvature of the die insert 47 will tend to match the curvature of the die insert 48 when the same are pressed together. Any slight angular axial mis-alignment of the optically curved surfaces of the die inserts will be corrected, since the die 45 and the die 46 are pressed together by means of the resiliently mounted pressing platens 53 and 54. The sleeve 49, not being a solid cylinder, will permit the die 45 to align itself with the die 46 since the ends of the sleeve 49, as represented at 50, may slide with respect each other to permit slight angular displacement of the dies.

The arrangement just described is particularly useful when producing an optical article having parallel and equidistantly spaced surfaces of optical curvature or can be used when producing lenses to prevent the production of prisms in the finished product due to slight mis-alignment of the die faces.

After the unit, consisting of the dies 45 and 46 with a lens blank 52 therebetween, has been pre-heated within the enclosure 10a to a determined molding temperature, the pre-heated unit may be worked in slightly different manners within the press for forming the blank 52 to the contour of the optically curved surfaces of the dies. If the press platens 53 and 54 are heated, the molding or forming temperature of the blank 52 and the dies 45 and 46 can be retained for an indefinite period of time, and whereby the rate of formation of the press of resinous material 52 can be exceedingly slow, if desired, or preferably is at the rate determined to be the proper rate not to produce optical strain within the finished lens. In any event, the molding temperature of the blank 52 is retained throughout the complete formation period thereof.

However, there are certain types of lenses which do not require that the molding temperature be retained for so long a period, particularly those lenses which require very slight formation. In these instances it would not be necessary to heat the platens 53 and 54, since the residual heat of the pre-heated dies 45 and 46 is sufficient to maintain the blank 52 within the molding temperature range for the period of time required for forming. The determining factor as to the length of time the blank 52 will be retained within its molding temperature range is the mass of the dies 45 and 46. It may readily be seen that the larger the mass of material from which the dies 45 and 46 are made, the greater the amount of residual heat which will be retained from the pre-heating step. It is quite possible that if the mass of the dies 45 and 46 is sufficiently large, the heating of the platens 53 and 54 may be entirely dispensed with when forming any optical article.

As specific examples of optical articles which can be formed without the necessity of heating the pressing platens 53 and 54, lenses of slight correction or optical planos can be cited as the specific examples. When forming this type of optical articles, the movement of the mass of the blank of resinous material is very slight and hence the time required for molding is considerably shorter than for lenses of relatively high correction. When forming optical articles of these types by pre-heating the blank of resinous material and the forming dies as a unit, it has been found that the residual heat is sufficient to permit the complete formation of the article. Thus, under these cases the pressing platens 53 and 54 need not be heated and may actually be cooled.

As an example of the method of the steps in forming a lens of slight correction or an optical plano, the curve chart of Figure 6 may be referred to. In this chart the lines 60 and 61 represent the temperatures of the die halves and the blank of resinous material respectively. As can be seen from this chart the temperature of the die halves and the lens blank is raised to the molding or forming temperature during the pre-heating operation.

Upon the mold and blank reaching the forming temperature they are removed from the heating oven and are then positioned in a forming press. Since the degree of correction for the optical article is very slight, the molding or forming pressure can be applied to the article relatively rapidly, as indicated by the line 62, whereby the forming time is reduced considerably. Also, since the forming pressure can be applied at a rapid rate, the necessity for maintaining the blank of resinous material at forming temperature over a prolonged period of time is eliminated. Hence, the pressing platens need not be heated and actually may be cooled, whereby the temperature of the blank and forming dies begins an immediate fall upon being positioned within the forming press.

The forming pressure will be retained upon the blank of resinous material until the blank has cooled sufficiently to set, at which time, the forming pressure can be released.

It may thus be seen that the manipulation of lenses of slight correction, or planos, may be slightly different from the usual procedure of forming lenses of high correction. However, the same general procedure must be followed in that the material cannot be deformed at a rate which produces optical strain, but since the articles of this type have such slight correction, the degree of formation is such that they can be moved more rapidly than can lenses of high correction.

It can be seen from the foregoing description that the method and apparatus of this invention has many advantages. The pre-heating of the dies and lens blanks, either separately or as complete units of assembly, permits the blanks of resinous material to be heated uniformly throughout the entire mass thereof. The blanks of resinous material can be pre-heated in large quantities and retained at a satisfactory forming temperature until ready for use. This is also true of the die elements. Further, it may readily be seen that the pre-heating of the dies and blank of resinous material is capable of permitting the elimination of the heating of the press platens. Also, the arrangement we have provided for securing the die elements 45 and 46 together during the entire pre-heating and forming operations provides an arrangement for axially aligning the die members. Under circumstances wherein it is desired to produce a plano lens or an optical article having equidistantly spaced optical curvatures, the resilient pressing means as well as the resiliency of the sleeve 49, will permit parallel alignment of the surface of optical curvature of the dies. When producing optical curves on both sides of a blank of resinous material the resilient support of the dies will permit the curved faces thereof to attain proper positions relative each other to prevent production of prisms.

While the form and embodiment disclosed and described constitutes a preferred form, yet it may readily be understood that we do not wish to limit our invention to the specific forms described but that the invention may be practiced by the use of any number of mechanical arrangements of apparatus, all of which come within the purview of this invention.

Having thus fully described our invention, what we claim as new and desire to secure by Letters Patent is:

1. A method for forming an optical article having an optical surface from a blank of resinous material which consists, of preheating a lens blank and forming mold uniformly throughout the mass of the mold and blank to one and the same predetermined temperature at which the blank is to be formed before applying any pressure upon the blank, and of applying closing pressure upon said mold while the temperature of the blank is maintained substantially constant at the predetermined forming temperature during the forming period to form the blank to the configuration of the mold.

2. A method for forming an optical article having an optical surface from a blank of resinous material which consists, of preheating a lens blank and forming mold uniformly throughout the mass of the mold and blank to one and the same predetermined temperature at which the blank is to be formed before applying any pressure upon the blank, of applying closing pressure upon said mold while the temperature of the blank is maintained substantially constant at the predetermined forming temperature during the forming period to form the blank to the configuration of the mold, and of cooling the mold while constantly maintaining substantially the maximum pressure of forming upon the blank to set the blank in its altered shape while the surfaces of the blank are constantly in engagement with the surfaces of the mold.

3. A method for forming an optical article having an optical surface from a blank of resinous material which consists, of preheating a lens blank and forming mold uniformly throughout the mass of the mold and blank to one and the same predetermined temperature at which the blank is to be formed before applying any pressure upon the blank, and of applying closing pressure upon said mold while the temperature of the blank is maintained substantially constant at the predetermined forming temperature during the forming period to form the blank to the configuration of the mold, said pressure being applied upon the mold to cause movement of the mass of the blank at the rate which does not produce optical strain in the blank sufficient to induce bi-refringence.

4. A method for forming an optical article having an optical surface upon a blank of resinous material which consists, of positioning a blank of resinous material between die halves having optical curvatures on the faces thereof, of heating the lens blank and the die halves as a unit within an enclosure maintained at a constant predetermined temperature sufficiently high to plasticize the blank for satisfactory physical alteration of the blank until the predetermined temperature of the enclosure exists throughout the mass of the unit, of positioning the heated unit in a heated press to maintain the temperature of the unit constant, and of applying closing pressure upon the unit to form the blank to the configuration of the dies.

5. A method for forming an optical article having an optical surface upon a blank of resinous material which consists, of positioning a blank of resinous material between die halves having optical curvatures on the faces thereof and retained in spaced relation with respect to each other and out of engagement with the optical area of the blank, of preheating the lens blank and the die halves as a unit within an enclosure maintained at a constant predetermined temperature sufficiently high to plasticize the blank for satisfactory physical alteration of the blank until the predetermined temperature exists throughout the mass of the unit, of positioning the heated unit in a heated press to maintain the temperature of the unit constant, and of applying closing pressure upon the unit to form the blank to the configuration of the dies.

6. A method for forming an optical article having an optical surface from a blank of resinous material which consists, of positioning a blank of resinous material between die halves having optical curvatures on the faces thereof retained in spaced relationship with respect to each other and out of engagement with the optical area of said blank, of preheating the lens blank and the die halves as a unit within an enclosure maintained at a constant predetermined temperature sufficiently high to plasticize the blank for satisfactory physical alteration of the blank until the predetermined temperature of the enclosure exists throughout the mass of the unit, of supporting the preheated unit in a press between resilient members that allow freedom of movement of the die halves angularly with respect to the axis of the die halves, and of applying closing pressure upon the unit to cause the curved optical faces of the die halves to engage the surfaces of the blank and arrange themselves in parallel relationship by uniformly distributing the plastic material within the blank between the die surfaces when forming the blank to the configuration of the die surfaces.

7. A method for forming an optical article having an optical surface upon resinous material which consists, of preheating a lens blank and forming mold as a unit within an enclosure maintained at a constant predetermined temperature sufficiently high to plasticize the blank for satisfactory physical alteration of the blank until the predetermined temperature of the enclosure exists throughout the mass of the unit, of positioning the preheated unit in a cool press, and of applying closing pressure upon said mold while the blank is therein to form the blank to the configuration of the mold before the temperature of the blank falls from within the forming temperature range maintained by the residual heat of the mold during the forming operation.

8. A method for preparing a blank of resinous material for formation into an optical article of high precision which consists, of placing a solid blank of resinous material between dies having high precision optical surfaces, of positioning the surfaces of the dies out of engagement with the optical area of the blank during the heating thereof to prevent overheating of local areas in the optical area, and of heating the blank and the dies as a unit to a uniform predetermined temperature within an enclosure maintained at a constant predetermined temperature sufficiently high to plasticize the blank for satisfactory physical alteration of the blank until the predetermined temperature of the enclosure exists throughout the mass of the unit.

9. A method for preparing a blank of resinous material for formation into an optical article of high precision which consists, of placing a solid blank of resinous material between dies having high precision optical surfaces, of positioning the surfaces of the dies out of engagement with the optical area of the blank during the heating thereof to prevent overheating of local areas in the optical area, of heating the blank and the dies as a unit to a uniform predetermined temperature within an enclosure maintained at a contant predetermined temperature sufficiently high to plasticize the blank for satisfactory physical alteration of the blank until the predetermined temperature of the enclosure exists throughout the mass of the unit, and of storing the unit in the enclosure until it is to be used in a press for forming the blank into an optical article.

CHARLES V. SMITH.
FRANK P. WILLIAMS.